(12) United States Patent
Wittebrood et al.

(10) Patent No.: US 9,216,467 B2
(45) Date of Patent: Dec. 22, 2015

(54) EXTRUDED 1XXX-SERIES ALUMINIUM ALLOY TUBE PRODUCT

(75) Inventors: Adrianus Jacobus Wittebrood, Velserbroek (NL); Steven Kirkham, Ransbach-Baumbach (DE); Achim Bürger, Höhr Grenzhausen (DE); Klaus Vieregge, Nauort (DE)

(73) Assignee: ALERIS ROLLED PRODUCTS GERMANY GMBH, Koblenz (DE)

( * ) Notice: Subject to any disclaimer, the term of this patent is extended or adjusted under 35 U.S.C. 154(b) by 77 days.

(21) Appl. No.: 14/112,074

(22) PCT Filed: Apr. 3, 2012

(86) PCT No.: PCT/EP2012/056013
§ 371 (c)(1),
(2), (4) Date: Nov. 15, 2013

(87) PCT Pub. No.: WO2012/143234
PCT Pub. Date: Oct. 26, 2012

(65) Prior Publication Data
US 2014/0054019 A1 Feb. 27, 2014

Related U.S. Application Data

(60) Provisional application No. 61/478,155, filed on Apr. 22, 2011.

(30) Foreign Application Priority Data

Apr. 21, 2011 (EP) ..................................... 11163391

(51) Int. Cl.
*B23K 1/19* (2006.01)
*B23K 35/24* (2006.01)
*B23K 1/00* (2006.01)
*B23K 35/28* (2006.01)
*C22C 21/00* (2006.01)
*C22C 21/02* (2006.01)
*C22C 21/04* (2006.01)
*C22C 21/06* (2006.01)
*C22C 21/08* (2006.01)
*B32B 15/01* (2006.01)
*B23K 1/008* (2006.01)
*F28F 21/08* (2006.01)
*F28F 1/02* (2006.01)
*B23P 15/26* (2006.01)

(52) U.S. Cl.
CPC . *B23K 1/00* (2013.01); *B23K 1/008* (2013.01); *B23K 1/0012* (2013.01); *B23K 1/19* (2013.01); *B23K 35/28* (2013.01); *B23K 35/286* (2013.01); *B23P 15/26* (2013.01); *B32B 15/016* (2013.01); *C22C 21/00* (2013.01); *C22C 21/02* (2013.01); *C22C 21/04* (2013.01); *C22C 21/06* (2013.01); *C22C 21/08* (2013.01); *F28F 1/022* (2013.01); *F28F 21/084* (2013.01); *B23K 2203/10* (2013.01)

(58) Field of Classification Search
CPC .......... B22F 3/18; B22F 5/106; F28F 21/084; B23K 35/002; B23K 35/286; B23K 1/0012; B23K 1/19; B23K 1/20; B23K 2201/14; B23K 2203/10; C22C 21/00; C22C 30/00
See application file for complete search history.

(56) References Cited

U.S. PATENT DOCUMENTS

| | | | |
|---|---|---|---|
| 5,762,132 | A | 6/1998 | Evans et al. |
| 6,234,377 | B1 * | 5/2001 | Teshima et al. ............... 228/183 |
| 6,623,693 | B1 | 9/2003 | Sircar |
| 2003/0098338 | A1 | 5/2003 | Dockus et al. |
| 2007/0158386 | A1 | 7/2007 | Dulac et al. |
| 2011/0111254 | A1 | 5/2011 | Wittebrood et al. |

FOREIGN PATENT DOCUMENTS

| | | |
|---|---|---|
| EP | 1158063 A1 | 11/2001 |
| EP | 1254965 A1 | 11/2002 |
| JP | 8120380 A | 5/1996 |
| WO | 2010000666 A1 | 1/2010 |
| WO | 2012143232 A1 | 10/2012 |

OTHER PUBLICATIONS

International Preliminary Report on Patentability of Oct. 22, 2013 for PCT International Application No. PCT/EP2012/056013, International Filing Date Apr. 3, 2012.
International Alloy Designations and Chemical Composition Limits for Wrought Aluminum and Wrought Aluminum Alloys, The Aluminum Association (2015), also known as 2015 Teal Sheets, URL <http://www.aluminum.org/sites/default/files/TEAL_1_OL_2015.pdf>,retrieved from the Internet Mar. 30, 2015.
International Search Report dated Jul. 31, 2012 with Written Opinion from PCT/EP2012/056013 to Wittebrood filed Apr. 3, 2012.
"International Alloy Designations and Chemical Composition Limitsfor Wrought Aluminum and Wrought Aluminum Alloys", International Alloy Designations and Chemical Composition Limitsfor Wrought Aluminum and Wrought Aluminum Alloys, XX,XX, Apr. 1, 2004, pp. 1-35, XP003023672, p. 1-p. 2.
Notice of Allowance mailed Sep. 23, 2015, from U.S. Appl. No. 14/112,179, filed Nov. 15, 2013.
Non-final Office action mailed Apr. 22, 2015, from U.S. Appl. No. 14/112,179, filed Nov. 15, 2013.
"International Alloy Designations and Chemical Composition Limits for Wrought Aluminum and Wrought Aluminum Alloys", The Aluminum Association, Apr. 2006, pp. 1-35, XP003023672.

* cited by examiner

*Primary Examiner* — Erin Saad
(74) *Attorney, Agent, or Firm* — Novak Druce Connolly Bove + Quigg LLP

(57) ABSTRACT

An aluminum alloy extruded tube product for a heat exchanger assembly and made from an 1xxx-series aluminum alloys and including furthermore a purposive addition of one or more wetting elements selected from the group of: Bi 0.03% to 0.5%, Pb 0.03% to 0.5%, Sb 0.03% to 0.5%, Li 0.03% to 0.5%, Se 0.03% to 0.5%, Y 0.03% to 0.05%, Th 0.03% to 0.05%, and the sum of these elements being 0.5% or less.

20 Claims, No Drawings

EXTRUDED 1XXX-SERIES ALUMINIUM ALLOY TUBE PRODUCT

CROSS-REFERENCE TO RELATED APPLICATIONS

This is a §371 National Stage Application of International Application No. PCT/EP2012/056013 filed on 3 Apr. 2012, claiming the priorities of European Patent Application No. 11163391.3 filed on 21 Apr. 2011 and U.S. Patent Application 61/478,155 filed on 22 Apr. 2011.

FIELD OF THE INVENTION

The invention relates to an extruded aluminium alloy tube product. More specifically this invention discloses aluminium tube products used in the manufacture of heat exchangers. The invention further relates to a method for manufacturing a heat exchanger assembly incorporating an extruded aluminium alloy tube product.

BACKGROUND TO THE INVENTION

As will be appreciated herein below, except as otherwise indicated, aluminium alloy designations and temper designations refer to the Aluminium Association designations in Aluminium Standards and Data and the Registration Records, as published by the Aluminium Association in 2010 and are well known to the person skilled in the art.

For any description of alloy compositions or preferred alloy compositions, all references to percentages are by weight percent unless otherwise indicated. The term "up to" and "up to about", as employed herein, explicitly includes, but is not limited to, the possibility of zero weight-percent of the particular alloying component to which it refers. For example, up to about 0.1% Zn may include an alloy having no Zn.

Heat exchangers and other similar equipment, such as condensers, evaporators and the like for use in car coolers, air conditioning systems, industrial cooling systems, etc. usually comprise a number of heat exchange tubes arranged in parallel between two headers, each tube joined at either end to one of the headers. Corrugated fins are disposed in an airflow clearance between adjacent heat exchange tubes and are brazed to the respective tubes.

The tubes or refrigerant tubes are being manufactured for example by folding a brazing sheet clad on the outside with a brazing material layer.

Alternatively the tubes are produced by means of extrusion. Typical extrusion based heat exchangers come essentially in two designs. The first design uses round tubing and fins that are mechanically attached to the round tubes by first lacing the tubes into holes punched in the fins, and then expanding the tubes to ensure that the tube's outer surface is in close mechanical contact with the fins.

The second typical design uses flat tubing or flat tubes having a plurality of channels in the tubing, commonly referred to as multi-void tubing or micro multi-void tubing or or multi port extruded tubes or multi-cavity tubing or multi-porthole tubing. This type of heat exchanger tubing is attached to the fins using a brazing process. The cross section of the flow channels can vary, e.g. circular, oval, square, rectangular, or other regular or irregular shapes. Typically, micro multi-void and multi-void tubing are about 10-80 mm in width and about 1-5 mm in height.

For the extruded multi-void tubing a wide variety of aluminium alloys are employed. The AA1000-series aluminium alloys are often selected where corrosion resistance is needed. Where higher strengths are required, the AA3000 and AA6000-series are often used. There are various disclosures of aluminium alloys for use in micro multi-void and multi-void tubing and whereby the alloy composition has been optimised to meet specific improvements in corrosion resistance or strength levels.

There is room for improvement in the art of aluminium extruded alloy tube stock for brazed heat exchangers and for methods of manufacturing such brazed heat exchangers, in particular for brazing methods that do not require the application of a brazing flux material.

DESCRIPTION OF THE INVENTION

It is an object of the invention to provide an aluminium alloy extruded tube stock material for brazed heat exchangers for use in particular for brazing methods that do not require the application of a brazing flux material.

This and other objects and further advantages are met or exceeded by the present invention and providing an aluminium alloy extruded tube product for a heat exchanger assembly and made from an AA1xxx-series aluminium alloy and comprising furthermore a purposive addition of one or more wetting elements selected from the group consisting of: Bi 0.03% to 0.5%, Pb 0.03% to 0.5%, Sb 0.03% to 0.5%, Li 0.03% to 0.5%, Se 0.03% to 0.5%, Y 0.03% to 0.05%, Th 0.03% to 0.05%, and the sum of these elements being 0.5% or less.

The wetting elements are selected from the group consisting of Bi, Pb, Li, Sb, Se, Y, and Th, and wherein the total amount of the wetting element(s) is in a range of about 0.01% to 0.5%. Preferably the total amount of wetting element(s) does not exceed 0.4%.

In accordance with the present invention it has been found that this invention allows for the manufacture of brazed assemblies incorporating aluminium workpieces including the aluminium alloy extruded tube and whereby there is no demand to provide a brazing flux material, like a fluoride flux, in a controlled atmosphere brazing process. During the brazing cycle the subject wetting agent at or near the extruded product surface region and that diffuses from the extruded product to the surface region into the molten aluminium-silicon filler alloy used to braze the extruded tube stock to the other components, such as fins and headers, and whereby the wetting agent facilitates a good flowability of the molten filler alloy such that in a controlled atmosphere brazing process a good fillet formation is being obtained, even without the use of a flux material.

It is known in the art that during controlled atmosphere brazing in combination with a brazing flux material, for example a fluoride based flux, the Mg level in the aluminium alloys should be kept at a low level, typically less that 0.2%, and more preferably of less than 0.05%, to avoid any detrimental interaction between the Mg and the flux. In accordance with the present invention it has been found that since the extruded aluminium alloy tubes material is ideally suitable for fluxless brazing in a controlled atmosphere brazing operation, there is a corresponding tolerance for Mg in the aluminium alloy. For that reason Mg can be tolerated at significantly higher levels or it can be added purposively. As set out hereinafter, another purposive role for Mg is that it may favourably interact with the wetting agent applied, in particular when Bi is being used.

In a preferred embodiment the element Bi is selected from this group of wetting elements and is in a range of about 0.03% to 0.5%, and preferably in a range of about 0.03% to 0.35%, and a more preferred upper-limit is 0.30%, as being the most efficient wetting element for this purpose in these aluminium alloy systems during a controlled atmosphere brazing operation. A preferred lower limit for the Bi addition is 0.06%. Typically Bi levels are about 0.1% and about 0.15%.

In the embodiment that Bi is added, and preferably solely Bi is being added, to the aluminium alloy extruded tube it is further preferred that the excess Mg content with respect to the stoichiometric composition of $Bi_2Mg_3$ is 0.1% or less, and preferably 0.07%. It has been found that Bi has a low solubility in aluminium and tends to separate out at the grain boundaries even when added at low levels of for example 0.1% or 0.15%. This can result in an undesirable white dusty appearance of the extruded tube when kept on stock for a long period of time. To overcome this effect a small amount of Mg will form $Bi_2Mg_3$ which stops separation at the grain boundaries. This $Bi_2Mg_3$ phase will however dissolve in the aluminium alloy upon heating during a brazing cycle and releasing the Bi to lower the surface tension of the molten AlSi filler.

The extruded aluminium alloy is preferably free of each of the elements Na, Li, K, and Ca to avoid any interference with the Bi and any optional Mg during the controlled atmosphere brazing operation. With "free" is meant that no purposeful addition of Na, Li, K, and Ca was made to the chemical composition but that due to impurities and/or leaking from contact with manufacturing equipment, trace quantities of Na, Li, K, and Ca may nevertheless find their way into the filler alloy product. For example, less than 0.006% is an example of a trace quantity.

In an embodiment of the invention the extruded tube the aluminium alloy may further comprise Mg up to about 0.3%.

Preferred alloys are those having a composition within the ranges of 1050, 1060, 1100, 1110, 1300, 1350, 1350A, 1370, and 1235. Preferred conditions are the F, O, H111, and H112 tempers.

In another aspect of the invention there is provided a method of manufacturing an article, a heat exchanger, joined by brazing or an assembly of brazed components, comprising the steps of:

(a) providing or forming the components to be brazed together of which at least one is made from an extruded aluminium alloy tube product, in particular a multi-porthole tube, according to this invention;

(b) assembling the components, the multi-porthole tube and other components such as fins, into an assembly;

(c) brazing the assembly without applying a brazing flux on the assembly of components, and brazing the whole assembly in a controlled inert gas atmosphere at a brazing temperature, typically at a temperature in a range of about 540° C. to 615° C., e.g. about 600° C. or about 590° C., for a period long enough for melting and spreading of a brazing material, preferably an Al—Si alloy brazing material, joining the various components including the extruded tube product and fins, e.g. a dwell time of 2 to 5 minutes, typically at around 2 or 3 minutes; and whereby typically the oxygen content in the brazing atmosphere should be as low as reasonable possible, and is preferably below about 200 ppm, and more preferably below about 100 ppm, for example at 15 ppm or less;

(d) cooling of the brazed assembly, typically to below about 100° C., e.g. to ambient temperature.

For the purposes of this invention, and as used herein, the term "controlled atmosphere brazing" or "CAB" refers to a brazing process which utilizes an inert atmosphere, for example, nitrogen, argon or helium in the brazing of aluminium alloy articles, and is distinct from vacuum brazing in particular in that with CAB the brazing atmosphere in the furnace during the brazing operation is at about regular atmospheric pressure, although a slight under-pressure (for example working at a pressure of about 0.1 bar or more) or having a slight over-pressure can be used to facilitate the control of the inert gas atmosphere and to prevent an influx of oxygen containing gas into the brazing furnace.

While various embodiments of the technology described herein have been described in detail, it is apparent that modifications and adaptations of those embodiments will occur to those skilled in the art. However, it is to be expressly understood that such modifications and adaptations are within the spirit and scope of the presently disclosed technology.

The invention claimed is:

1. A method of manufacturing an article joined by brazing or an assembly of brazed components, comprising the steps of:

(a) forming the components of which at least one is made from an extruded aluminium alloy tube product, made from an AA1xxx-series aluminium alloy selected from the group of: 1050, 1060, 1100, 1110, 1300, 1350, 1350A, 1370 and 1235, and comprising furthermore a purposive addition of one or more wetting elements selected from the group consisting of: Bi 0.03 wt % to 0.5 wt %, Pb 0.03 wt % to 0.5 wt %, Sb 0.03 wt % to 0.5 wt %, Li 0.03 wt % to 0.5 wt %, Se 0.03 wt % to 0.5 wt %, Y 0.03 wt % to 0.05 wt %, Th 0.03 wt % to 0.05 wt %, and the sum of these elements being 0.5 wt % or less, wherein the alloy is free of each of the elements Na, Li, K and Ca, (b) assembling the components into an assembly, (c) brazing the assembly without applying brazing flux on the assembly of components and brazing the whole assembly in an inert controlled gas atmosphere at a brazing temperature to form a brazed assembly, and (d) cooling of the brazed assembly.

2. The method according to claim 1, wherein the AA1xxx-series aluminium alloys comprise one or more said wetting elements selected from the group consisting of: Pb 0.03 wt % to 0.5 wt %, Sb 0.03 wt % to 0.5 wt %, Li 0.03 wt % to 0.5 wt %, Se 0.03 wt % to 0.5 wt %, Y 0.03 wt % to 0.05 wt %, Th 0.03 wt % to 0.05 wt %, and the sum of these elements being 0.5 wt % or less.

3. The method according to claim 1, wherein the AA1xxx alloys further comprise Mg.

4. The method according to claim 3, and wherein the AA1xxx alloys comprise Mg and 0.03 wt % to 0.5 wt % Bi, and wherein the excess Mg content with respect to the stoichiometric composition of $Bi_2Mg_3$ is 0.1 wt % or less.

5. The method according to claim 1, wherein the AA1xxx alloys comprise solely a purposive addition of Bi in a range of 0.03 wt % to 0.5 wt %.

6. The method according to claim 1, wherein the AA1xxx-series aluminium alloy is an alloy selected from the group of: 1050, 1060, 1100, 1110, 1300, 1350, 1350A, 1370, and 1235.

7. The method according to claim 1, wherein the extruded tube is in a condition selected from the group of: F, O, H111, and H112 temper.

8. The method according to claim 1, wherein the assembly is a heat exchanger assembly, wherein the tube is a multi-porthole tube of the heat exchanger assembly.

9. The method according to claim 1, wherein the AA1xxx-series aluminium alloy comprises 0.03 wt % to 0.30 wt % Bi is present.

10. The method according to claim 1, wherein the AA1xxx-series aluminium alloy comprises 0.063 Wt % to 0.5 wt % Bi.

11. The method according to claim 10, wherein the extruded aluminium tube product is a multi-porthole tube.

12. The method according to claim 10, wherein during step (c) the brazing temperature is in the range of 540° C. to 615° C.

13. The method according to claim 10, wherein during step (c) the oxygen content in the inert controlled gas atmosphere is below 200 ppm.

14. The method according to claim 1, wherein the AA1xxx-series aluminium alloy comprises solely a purposive addition of Bi in a range 0.03 wt % to 0.35 wt %.

15. The method according to claim 10, wherein during step (c) the oxygen content in the inert controlled gas atmosphere is below 100 ppm.

16. The method according to claim 10, wherein during step (c) the oxygen content in the inert controlled gas atmosphere is less than 15 ppm.

17. The method according to claim 1, wherein the AA1xxx-series aluminium alloy is an alloy selected from the group of: 1110, 1350, 1350A, and 1370.

18. A method of manufacturing an article joined by brazing or an assembly of brazed components, comprising the steps of:
   (a) assembling the components into an assembly, said components comprising at least a first component and a second component, wherein said first component is a tube, and said first component consists of extruded AA1xxx-series aluminium alloy selected from the group of: 1050, 1060, 1100, 1110, 1300, 1350, 1350A, 1370 and 1235, and comprising furthermore a purposive addition of one or more wetting elements selected from the group consisting of: Bi 0.03 wt % to 0.5 wt %, Pb 0.03 wt % to 0.5 wt %, Sb 0.03 wt % to 0.5 wt %, Li 0.03 wt % to 0.5 wt %, Se 0.03 wt % to 0.5 wt %; Y 0.03 wt % to 0.05 wt %, Th 0.03 wt % to 0.05 wt %, and the sum of these elements being 0.5 wt % or less, wherein the alloy is free of each of the elements Na, Li, K and Ca,
   (b) brazing the assembly without applying brazing flux on the assembly of components and brazing the whole assembly in an inert controlled gas atmosphere at a brazing temperature to form a brazed assembly, and
   (c) cooling of the brazed assembly.

19. The method according to claim 18, wherein cooled brazed assembly is a heat exchanger, wherein during step (b) the oxygen content in the inert controlled gas atmosphere is below 200 ppm.

20. The method according to claim 18, wherein the AA1xxx-series aluminium alloy is an alloy selected from the group of: 1110, 1350, 1350A, and 1370.

\* \* \* \* \*